(12) United States Patent
Palanki et al.

(10) Patent No.: US 8,493,887 B2
(45) Date of Patent: Jul. 23, 2013

(54) CENTRALIZED CONTROL OF PEER DISCOVERY PILOT TRANSMISSION

(75) Inventors: Ravi Palanki, San Diego, CA (US); Avneesh Agrawal, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 12/643,845

(22) Filed: Dec. 21, 2009

(65) Prior Publication Data

US 2010/0165882 A1 Jul. 1, 2010

Related U.S. Application Data

(60) Provisional application No. 61/141,628, filed on Dec. 30, 2008.

(51) Int. Cl.
*H04L 12/28* (2006.01)
*H04W 4/00* (2009.01)

(52) U.S. Cl.
USPC .......................................... 370/254; 370/328

(58) Field of Classification Search
USPC ................................... 370/254, 328
See application file for complete search history.

(56) References Cited

U.S. PATENT DOCUMENTS

| 6,415,146 | B1 | | 7/2002 | Capece | |
|---|---|---|---|---|---|
| 7,239,618 | B1 | * | 7/2007 | La Porta et al. | 370/331 |
| 2002/0184310 | A1 | * | 12/2002 | Traversat et al. | 709/204 |
| 2004/0228305 | A1 | * | 11/2004 | Grieco | 370/335 |
| 2008/0043637 | A1 | * | 2/2008 | Rahman | 370/254 |
| 2008/0112334 | A1 | * | 5/2008 | Laroia et al. | 370/254 |
| 2009/0037567 | A1 | * | 2/2009 | Koh et al. | 709/223 |
| 2009/0273520 | A1 | * | 11/2009 | Shao et al. | 342/417 |
| 2011/0009062 | A1 | * | 1/2011 | Anschutz et al. | 455/41.2 |

FOREIGN PATENT DOCUMENTS

| EP | 1998499 | | 12/2008 |
|---|---|---|---|
| GB | 2444995 | * | 6/2008 |
| JP | 2003264871 A | | 9/2003 |
| JP | 2006520158 A | | 8/2006 |
| JP | 2009516418 A | | 4/2009 |
| WO | 2004077920 A2 | | 9/2004 |
| WO | 2005050919 A2 | | 6/2005 |
| WO | 2007055623 A1 | | 5/2007 |

OTHER PUBLICATIONS

International Search Report and Written Opinion—PCT/US2009/069612—ISA/EPO—Jun. 29, 2010.

* cited by examiner

*Primary Examiner* — Ronald Abelson
(74) *Attorney, Agent, or Firm* — James K. O'Hare (57) ABSTRACT

Techniques for centralized control of peer discovery pilot transmission are described. In an aspect, a designated network entity (e.g., a base station or a network controller) may control transmission of peer discovery pilots by stations located within its coverage area. In one design, the network entity may receive signaling triggering peer discovery pilot transmission. The network entity may direct each of at least one station to transmit a peer discovery pilot to allow one or more stations to detect the at least one station. The peer discovery pilot may include at least one synchronization signal or at least one reference signal. The network entity may receive pilot measurements from the one or more stations for peer discovery pilots from peer stations and/or reference signals from base stations. The network entity may determine whether or not to select peer-to-peer communication for two stations based on the pilot measurements.

26 Claims, 7 Drawing Sheets

CENTRALIZED CONTROL OF PEER DISCOVERY PILOT TRANSMISSION

The present application claims priority to provisional U.S. Application Ser. No. 61/141,628, entitled "CENTRALIZED PROXIMITY DETECTION," filed Dec. 30, 2008, assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate directly with another UE via peer-to-peer communication. It may be desirable to control communication of the UE such that good performance can be achieved for both the UE and the network.

SUMMARY

Techniques for centralized control of peer discovery pilot transmission are described herein. In an aspect, a designated network entity (e.g., a base station or a network controller) may control transmission of peer discovery pilots by stations located within its coverage area. A peer discovery pilot is a pilot or a known transmission used by peer stations to discover a station transmitting the pilot or known transmission.

In one design, a network entity may receive signaling triggering peer discovery pilot transmission. The network entity may direct each of at least one station to transmit a peer discovery pilot to allow one or more stations to detect the at least one station. The peer discovery pilot may comprise at least one synchronization signal, or at least one reference signal, or at least one transmission on at least one physical channel.

In one design, the network entity may receive signaling sent by a first station to initiate communication with a second station. The network entity may then (i) direct the second station to transmit a peer discovery pilot to allow the first station to detect the second station, or (ii) direct the first station to transmit a peer discovery pilot to allow the second station to detect the first station, or (iii) direct both stations to transmit peer discovery pilots to allow each station to detect the other station. In another design, the network entity may receive signaling from the first station to initiate communication with any station in a particular class of stations. The network entity may then direct each station in the particular class to transmit a peer discovery pilot to allow the first station to detect that station. In yet another design, the network entity may receive signaling from a UE to initiate communication with a femto cell. The network entity may then direct the femto cell to transmit a peer discovery pilot when the UE becomes active or based on some other criteria. The network entity may also receive other signaling triggering peer discovery pilot transmission.

The network entity may receive pilot measurements from the one or more stations. The pilot measurements from each station may comprise pilot measurements for peer discovery pilots and/or pilot measurements for reference signals from base stations. The network entity may determine whether or not to select peer-to-peer communication for two stations based on the pilot measurements. One station may be a station transmitting a peer discovery pilot, and the other station may be a station receiving the peer discovery pilot. If peer-to-peer communication is selected, then the network entity may assign resources to the two stations and may send information indicative of the assigned resources to these stations. These two stations may then communicate peer-to-peer using the assigned resources.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
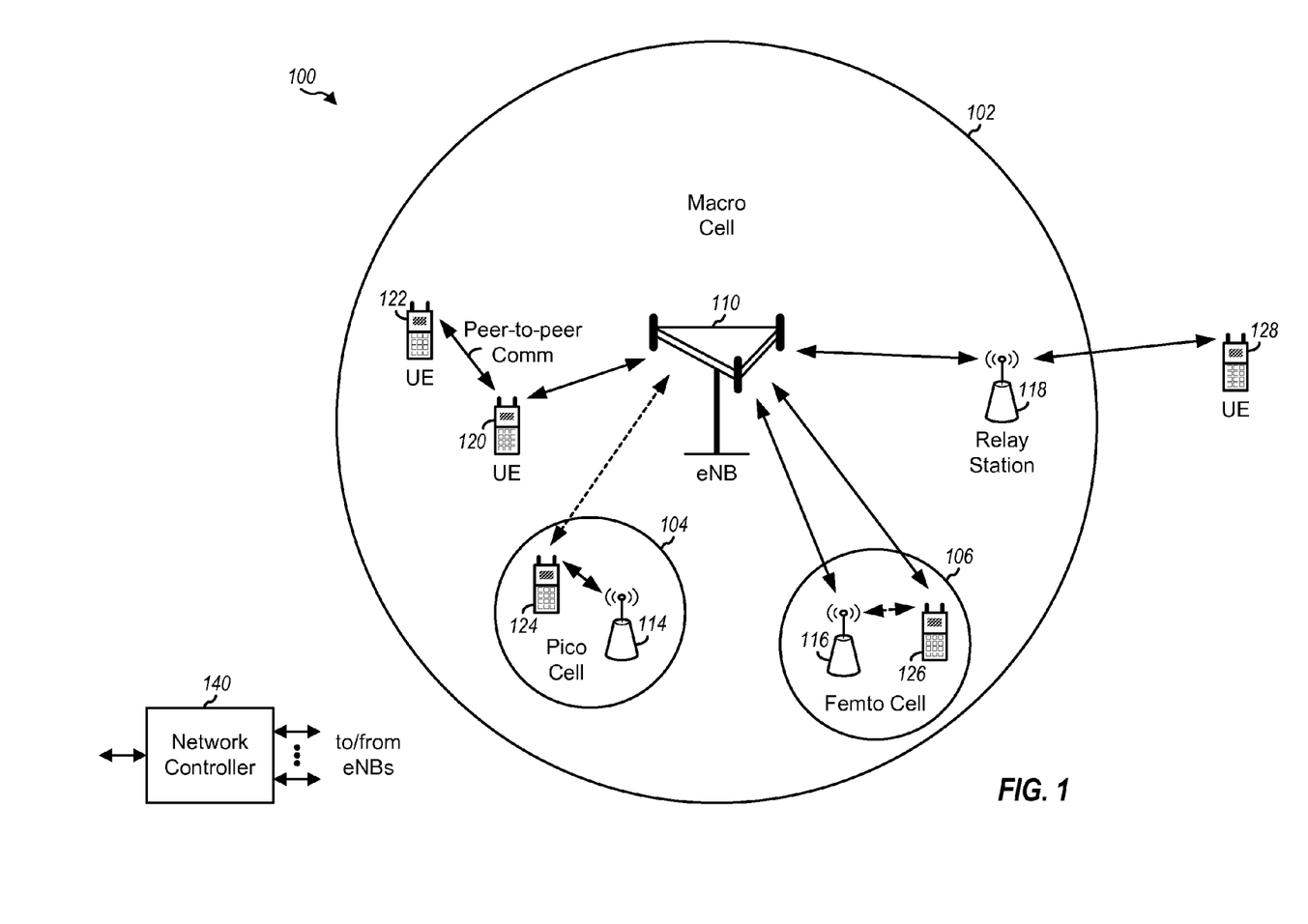
FIG. 1 shows a wireless communication network.

FIG. 1 shows a wireless communication network 100, which may be a wireless wide area network (WWAN). Network 100 may be a cellular network such as an LTE network or some other WWAN. Network 100 may include a number of evolved Node Bs (eNBs) and other network entities that can support communication for a number of UEs. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB. In FIG. 1, an eNB 110 may be a macro eNB for a macro cell 102, an eNB 114 may be a pico eNB for a pico cell 104, and an eNB 116 may be a femto eNB for a femto cell 106. The terms "base station", "eNB", and "cell" may be used interchangeably.

A relay station 118 may be a station that receives a transmission of data and/or other information from an upstream station (e.g., eNB 110 or a UE 128) and sends a transmission of the data and/or other information to a downstream station (e.g., UE 128 or eNB 110). A relay station may also be a UE that relays transmissions for other UEs. A relay station may also be referred to as a relay, a relay eNB, a relay UE, etc. In FIG. 1, relay station 118 may communicate with UE 128 via an access link and may communicate with eNB 110 via a backhaul link in order to facilitate communication between UE 128 and eNB 110.

UEs 120 to 128 may be dispersed throughout the wireless network, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with eNBs and/or relay stations in a WWAN. A UE may also communicate with access points in a wireless local area network (WLAN), which may utilize IEEE 802.11 (Wi-Fi) or some other radio technology. A UE may also communicate with other devices in a wireless personal area network (WPAN), which may utilize Bluetooth or some other radio technology.

A network controller 140 may couple to a set of eNBs and may provide coordination and control for these eNBs. Network controller 140 may comprise a Radio Network Controller (RNC), a Mobile Switching Center (MSC), a Mobility Management Entity (MME), a Serving Gateway (SGW), a Packet Data Network (PDN) Gateway (PGW), and/or some other network entity.

In general, a macro eNB may communicate with any number of stations. A macro eNB may also control communication for stations within its coverage. A station may be a UE, a relay station, a femto eNB, a pico eNB, a peripheral device such as a printer, etc. For simplicity, in much of the description below, a macro eNB may be referred to as simply an eNB.

Network 100 may support peer-to-peer (P2P) communication between stations. For P2P communication, two stations (e.g., UEs 120 and 122) may communicate directly with each other without communicating with an eNB in a WWAN. P2P communication may reduce the load on the WWAN for local communications between the stations. P2P communication between UEs may also allow one of the UEs to act as a relay for the other UE, thereby enabling the other UE to connect to an eNB.

To facilitate P2P, all stations capable of P2P communication may transmit pilots that may allow other stations to discover the transmitting stations. A pilot is a signal or transmission that is known a priori by both a transmitting station and a receiving station. A pilot may also be referred to as a reference signal, a synchronization signal, a preamble, etc. A pilot used for discovery of peer stations may be referred to as a peer discovery pilot. Transmission of peer discovery pilots all the time by stations may reduce battery life of the stations and may be especially undesirable when there are no other stations interested in communicating with the transmitting stations. Furthermore, continual transmission of peer discovery pilots by the stations may increase interference and hence consume a larger fraction of bandwidth for such pilot transmissions.

In an aspect, centralized control of peer discovery pilot transmission may be supported to improve performance. A designated network entity may control transmission of peer discovery pilots by stations located within its coverage area. This coverage area may be a cell, a cluster of cells, etc. In one design, the network entity may be an eNB that can control peer discovery pilot transmission for stations within its coverage. In another design, the network entity may be a network controller such as an MME that can control peer discovery pilot transmission for stations in a cluster of cells.

Figure 2:
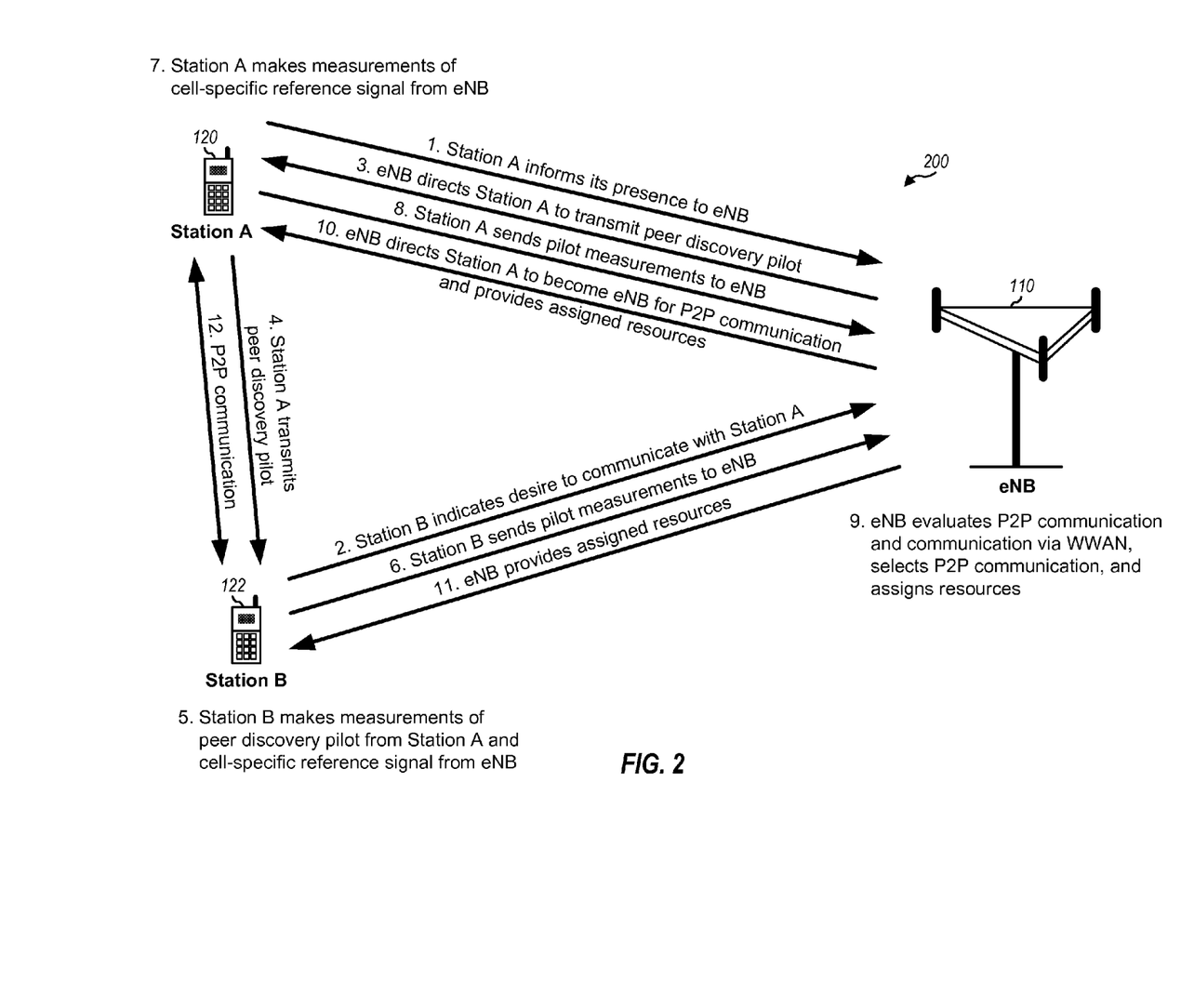
FIG. 2 shows a process for centralized control of peer discovery pilot transmission.

FIG. 2 shows a design of a process 200 for centralized control of peer discovery pilot transmission and P2P communication. For clarity, process 200 assumes that the designed network entity is an eNB (e.g., eNB 110 in FIG. 1). Initially, station A (e.g., UE 120 in FIG. 1) may detect the eNB and may inform its presence to the eNB (step 1). The eNB may be the closest eNB to station A or may be selected based on some other criteria. Station A may inform its presence and its P2P capability via Layer 3 (L3) signaling during registration. The eNB may then be aware of the presence of station A and its P2P capability.

Station B (e.g., UE 122 in FIG. 1) may desire to communicate with station A and may send a message to the eNB to indicate this desire (step 2). For example, station B may send a request to initiate a call with station A and may provide a UE identity (ID) of station A as well as the P2P capability of station B to the eNB. As another example, station B may register with the eNB or a neighbor eNB, which may then inform the eNB of the presence of station B. Registration via the neighbor eNB may enable P2P communication between two stations located close to each other but in neighboring cells. In general, the eNB may receive any signaling that may indicate a desire of station B to communicate with station A.

The eNB may ascertain that both stations A and B support P2P communication but may not know whether stations A and B are within range of one another. In one design that is shown in FIG. 2, the eNB may direct station A to start transmitting a peer discovery pilot and may provide pertinent parameters for generating and/or transmitting the peer discovery pilot, as described below (step 3). The eNB may also direct station B to detect for the peer discovery pilot from station A (not shown in FIG. 2). Alternatively, station B may autonomously detect for the peer discovery pilot from station A without any instruction from the eNB.

Station A may receive the directive from the eNB and may start transmitting a peer discovery pilot (step 4). Station B may detect for the peer discovery pilot from station A and may make measurements for pilot strength and/or other link metrics (step 5). Station B may also make measurements for a pilot (e.g., a cell-specific reference signal) from the eNB (also step 5). Station B may then send pilot measurements to the eNB (step 6). Other stations in the vicinity of station A may also make measurements of the peer discovery pilot from station A and may report their pilot measurements to the eNB, e.g., if the pilot strength exceeds a threshold. The eNB may use the pilot measurements from the other stations for interference management. For example, the eNB may decide to not select P2P communication for stations A and B if these stations would cause high interference to other stations in the vicinity. Station A may also make measurements for the pilot from the eNB (step 7) and may send the pilot measurements to the eNB (step 8).

The eNB may receive pilot measurements from stations A and B and possibly other stations in the vicinity. The eNB may determine the quality of the P2P communication link between stations A and B, the quality of the WWAN communication link between station A and the eNB, and the quality of the WWAN communication link between station B and the eNB based on the pilot measurements from stations A and B. The eNB may then select either P2P communication or WWAN communication (i.e., communication via the WWAN) for stations A and B based on the qualities of the various communication links (step 9). The eNB may make this selection based on whether it would be better for stations A and B to communicate directly via peer-to-peer or indirectly via the WWAN. For example, if stations A and B are very far from each other or are in different cells/geographic areas, then the eNB may decide that it would be better for these stations to communicate via the WWAN, e.g., using WWAN resources. Conversely, if stations A and B are relatively close to each other, then the eNB may instruct these stations to communicate directly with each other so that WWAN resources are not utilized. In one design, the eNB may compare the P2P link quality against a threshold, select P2P communication if the P2P link quality exceeds the threshold, and select WWAN communication otherwise. The eNB may also select P2P communication or WWAN communication for stations A and B in other manners.

The eNB may determine that P2P communication is better and may assign resources to stations A and B for P2P communication (also step 9). The eNB may instruct one station to act as an eNB for P2P communication with the other station, which may act as a UE (step 10). For example, the eNB may instruct station A to act as an eNB, and station B may act as a UE (as shown in FIG. 2). Alternatively, the eNB may instruct station B to act as an eNB, and station A may act as a UE (not shown in FIG. 2). In one design, the station acting as an eNB may transmit on the downlink and receive on the uplink. The station acting as a UE may transmit on the uplink and receive on the downlink. The eNB may send the assigned resources to stations A and B (steps 10 and 11). Stations A and B may then communicate peer-to-peer using the assigned resources (step 12).

Although not shown in FIG. 2, the eNB may determine that WWAN communication is better than P2P communication and may then direct station A to stop transmitting its peer discovery pilot and operate like a regular UE. Stations A and B may then communicate with each other via the eNB for WWAN communication. The eNB may request station A to periodically transmit a peer discovery pilot. Stations A and B may periodically send pilot measurements to the eNB, which may determine whether to switch to P2P communication.

In one design, both stations A and B support P2P functionality, which may include transmitting a peer discovery pilot if directed by the eNB and acting as an eNB for P2P communication if directed by the eNB. The station acting as an eNB (e.g., station A in FIG. 2) may provide connectivity for the other station (e.g., station B in FIG. 2) to the network. In another design, one station may support P2P functionality while the other station may be a legacy station that does not support P2P functionality. The legacy station (e.g., station B in FIG. 2) may make measurements of the peer discovery pilot from the other station, report pilot measurements to the eNB, and act as a UE for P2P communication if directed by the eNB.

FIG. 2 shows a specific design of centralized control of peer discovery pilot transmission. In this design, the eNB instructs station A to start transmitting a peer discovery pilot in response to signaling received from station B. In another design, the eNB may instruct station B (instead of station A) to start transmitting a peer discovery pilot. Station A may then measure the peer discovery pilot from station B and report pilot measurements to the eNB. In yet another design, the eNB may instruct both stations A and B to start transmitting peer discovery pilots. Each station may then measure the peer discovery pilot from the other station and may report pilot measurements to the eNB. Stations A and B may transmit their peer discovery pilots on both the downlink and uplink to enable the eNB to gain full knowledge of the channel conditions on the downlink and uplink. Alternatively, one station may transmit its peer discovery pilot on the downlink, and the other station may transmit its peer discovery pilot on the uplink.

In one design, there may be a one-to-one mapping between stations and peer discovery pilots. In this design, a station may be identified based on its peer discovery pilot. In another design, there may be a many-to-one mapping between stations and peer discovery pilots. In this design, multiple stations may transmit the same peer discovery pilot. These stations may be differentiated based on a second pilot or transmission, which may be sent by a transmitting station upon receiving an indication of the peer discovery pilot being detected by a receiving station. In yet another design, there may be a one-to-many mapping between stations and peer discovery pilots. In this design, a given station may transmit different peer discovery pilots for multiple services being supported and/or requested by the station. For example, a laptop may transmit two peer discovery pilots corresponding to "I am interested in gaming" and "I provide a web server". These are sometimes referred to as "expressions".

In one design, a peer discovery pilot for a station may be static and may not change over time. In another design, a peer discovery pilot for a station may be time varying and may change over time. This design may be used to accommodate a large number of stations and/or expressions. A peer discovery pilot may be varied by changing a sequence used to generate the pilot and/or by changing time-frequency resources used to send the pilot.

In general, the same or different radio technologies may be used for peer discovery pilot transmission, P2P communication between stations, and WWAN communication between stations and eNBs. Stations A and B may communicate peer-to-peer using the same radio technology used by the WWAN (e.g., LTE-A) or a different radio technology (e.g., FlashLinQ, which is designed especially for P2P communication). Peer discovery pilot may be transmitted using the same radio technology used for P2P communication or WWAN communication or a different radio technology.

In general, the same or different frequency channels/spectrum may be used for peer discovery pilot transmission, P2P communication, and WWAN communication. Stations A and B may communicate peer-to-peer on the same frequency channel used for WWAN communication. In this case, some resources may be reserved for P2P communication between stations A and B. Stations A and B may also communicate on a different frequency channel not used for WWAN communication. Peer discovery pilot may be transmitted on the same frequency channel used for P2P communication or WWAN communication or on a different frequency channel.

FIG. 2 shows an example of peer discovery pilot transmission for a case in which a station desires to communicate with a specific station. This may be ascertained, for example, when one station provides the unique ID of the other station with which communication is desired. The eNB may then instruct one or both stations to transmit peer discovery pilots. The eNB may also inform a receiving station to detect for a peer discovery pilot from a transmitting station.

In another design, a station may desire to communicate with any station in a particular class of stations. For example, a laptop may desire to communicate with printers in its vicinity, but not necessarily with any specific printer. In this case, the eNB may ask printers in the laptop's vicinity to transmit peer discovery pilots. In general, when a requesting station is interested in communicating with a general peer station instead of a specific peer station, the eNB may activate peer stations near the vicinity of the requesting station to transmit peer discovery pilots. The eNB may also provide the requesting station with a set of peer discovery signals from a set of peer stations to detect for. The eNB may use geographic location and/or radio location to determine peer stations near the vicinity of the requesting station. The geographic location may be ascertained based on satellite-based and/or network-based positioning methods. The radio location may be ascertained based on pilot measurements. For example, stations with similar pilot measurements for a set of transmitters (e.g., eNBs) may be deemed to be in nearby radio location.

FIG. 2 shows a design in which the eNB directs one or both stations to transmit peer discovery pilots and thereafter selects P2P communication or WWAN communication for the two stations. In another design, the eNB may support WWAN communication for the two stations, e.g., prior to directing one or both stations to transmit peer discovery pilots. After receiving the pilot measurements for the P2P link as well as the WWAN links from the stations, the eNB may determine whether it would be better to have the two stations continue with WWAN communication or to switch to P2P communication.

FIG. 2 shows a scenario in which two stations A and B are under control of a single network entity (e.g., the same eNB). In another scenario, stations A and B may be under the control of different network entities (e.g., different eNBs). In this case, information about the peer stations and/or information about their peer discovery pilots may be exchanged between the network entities controlling these stations.

A network entity may control peer discovery pilot transmission by a station, as described above for FIG. 2. A station may also transmit a peer discovery pilot without network control, e.g., when the station is outside of network coverage or when another station is generally expected to be detecting for the peer discovery pilot. The station may thereafter transmit the peer discovery pilot under network control, e.g., when the station moves within the network coverage. This may be referred to as a fallback mode.

A peer discovery pilot used for peer detection may be defined in various manners. In one design, a peer discovery pilot may be different (e.g., in structure) from pilots and reference signals normally sent on the downlink and uplink in the WWAN. A transmitting station may transmit a peer discovery pilot to allow other stations to detect the transmitting station. A receiving station may be able to distinguish the transmitting station as a peer station, instead of an eNB or a UE, based on the structure of the peer discovery pilot.

In another design, a peer discovery pilot may be a legacy compatible pilot that is sent on the downlink by an eNB or on the uplink by a UE for WWAN communication. For the downlink in LTE, a peer discovery pilot may comprise a primary synchronization signal, a secondary synchronization signal, a cell-specific reference signal, a positioning reference signal, a UE-specific reference signal, and/or other signals or transmissions sent by an eNB. For the uplink in LTE, a peer discovery pilot may comprise a sounding reference signal, a demodulation reference signal, and/or other signals or transmissions sent by a UE. A transmitting station may generate a peer discovery pilot based on one or more identities (IDs) and/or other parameters assigned to the station and may transmit the peer discovery pilot. A receiving station may be able to distinguish the transmitting station as a peer station instead of an eNB or a UE based on the peer discovery pilot, e.g., based on the identities and/or parameters used to generate the peer discovery pilot.

Figure 3:
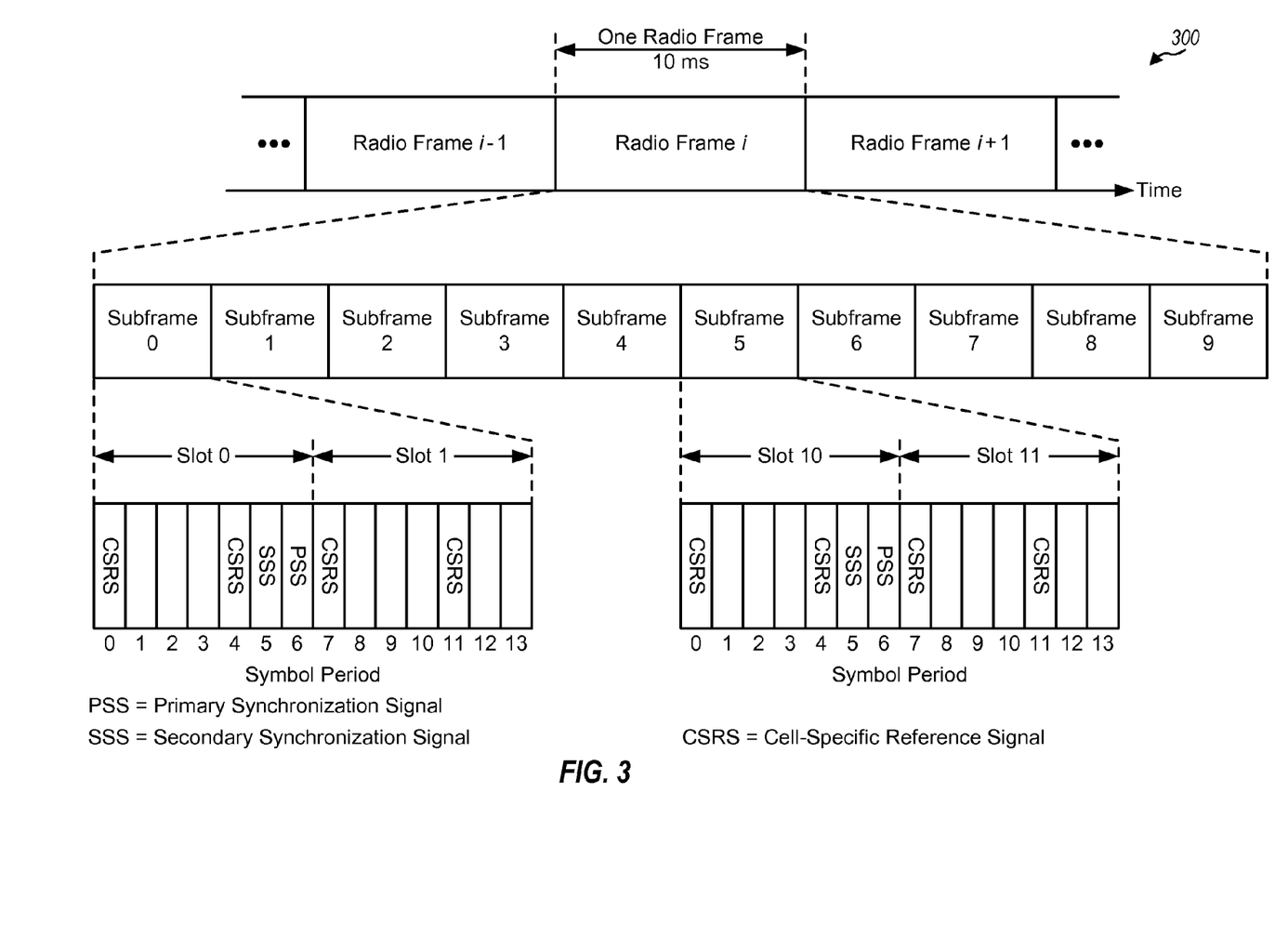
FIG. 3 shows an exemplary frame structure.

FIG. 3 shows an exemplary frame structure 300 used for the downlink in LTE. The transmission timeline for the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The time-frequency resources available for the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be sent in each symbol period of a subframe. On the uplink, an SC-FDMA symbol may be sent in each symbol period of a subframe. An OFDM symbol or an SC-FDMA symbol may include non-zero values for resource elements used for transmission and zero values for resource elements not used for transmission.

FIG. 3 also shows exemplary transmissions of primary and secondary synchronization signals and a cell-specific reference signal for one cell in LTE. The primary synchronization signal (PSS) and the secondary synchronization signal (SSS) may be sent in symbol periods 6 and 5, respectively, of each of slots 0 and 10 of each radio frame. The cell-specific reference signal (CSRS) may be sent (i) in symbol periods 0 and 4 of each slot for an eNB equipped with two antennas, as shown in FIG. 3, or (ii) in symbol periods 0, 1 and 4 of each slot for an eNB equipped with four antennas.

A primary synchronization signal for a cell may be generated as follows. A sample sequence may be generated based on a Zadoff-Chu sequence, which may in turn be generated based on a cell ID of the cell. The sample sequence may be mapped to 62 resource elements (corresponding to the center 930 KHz of the system bandwidth) in an OFDM symbol carrying the primary synchronization signal. Zero values may be mapped to the remaining resource elements of the OFDM symbol. The primary synchronization signal may thus be generated based on the cell ID and sent in the center 930 KHz of the system bandwidth.

A secondary synchronization signal for the cell may be generated as follows. A set of pseudo-random sequences and scrambling sequences may be generated based on the cell ID of the cell. A sample sequence may be generated based on the set of PN sequences and scrambling sequences. The sample sequence may be mapped to 62 resource elements (corresponding to the center 930 KHz of the system bandwidth) in an OFDM symbol carrying the secondary synchronization signal. Zero values may be mapped to the remaining resource elements in the OFDM symbol. The secondary synchronization signal may thus be generated based on the cell ID and sent in the center 930 KHz of the system bandwidth.

A cell-specific reference signal for the cell may be generated as follows. A reference signal sequence may be generated based on a pseudo-random sequence, which may be initialized based on the cell ID of the cell. The reference signal sequence may be mapped to a set of resource elements in an OFDM symbol carrying the cell-specific reference signal. The set of resource elements may occupy subcarriers selected based on the cell ID and spaced apart by six subcarriers.

In one design, a peer discovery pilot may comprise the primary and secondary synchronization signals sent on the downlink. A transmitting station may be assigned a cell ID used to identify the station. This cell ID may be selected to be different from cell IDs assigned to nearby cells in order to avoid collision. This cell ID may also be time varying to mitigate collision with the cell IDs of the nearby cells. In any case, the transmitting station may generate the primary and secondary synchronization signals based on its assigned cell ID and may transmit the synchronization signals in similar manner as an eNB. A receiving station may detect and measure the synchronization signals from the transmitting station in similar manner as the synchronization signals from an eNB.

The use of the synchronization signals for the peer discovery pilot may support P2P communication for legacy UEs, which may operate as normal UEs for P2P communication. However, coverage hole may be created in a single carrier deployment due to transmission of the synchronization signals for peer discovery. An eNB may monitor pilot measurements to ensure that there are no outages due to transmission of the synchronization signals for peer discovery.

In another design, a peer discovery pilot may comprise a cell-specific reference signal sent on the downlink. A transmitting station may be assigned a cell ID used to identify the station. The transmitting station may generate the cell-specific reference signal based on the assigned cell ID and may transmit the cell-specific reference signal in similar manner as an eNB. A receiving station may detect and measure the cell-specific reference signal from the transmitting station in similar manner as a cell-specific reference signal from an eNB.

In yet another design, a peer discovery pilot may comprise a positioning reference signal sent on the downlink. The positioning reference signal may also be referred to as a low reuse preamble (LRP) and may be transmitted with low reuse so that it can be detected even by stations observing high interference. Some time-frequency resources may be reserved for transmitting positioning reference signals. A transmitting station may transmit a positioning reference signal on some of the reserved time-frequency resources.

In yet another design, a peer discovery pilot may comprise a UE-specific reference signal sent on the downlink. The UE-specific reference signal may be generated based on a pseudo-random sequence. For WWAN communication, the pseudo-random sequence may be initialized based on a cell ID of a transmitting cell and a UE ID of a recipient UE. For peer discovery, the pseudo-random sequence may be initialized based on a cell ID assigned to a transmitting station and/or a UE ID assigned to a receiving station. The reference signal sequence may be mapped to a set of resource elements in an OFDM symbol carrying the UE-specific reference signal.

In yet another design, a peer discovery pilot may comprise a sounding reference signal sent on the uplink. The sounding reference signal may be generated based on a sounding reference signal sequence, which may in turn be generated based on a cyclic shift of a base sequence. For WWAN communication, the cyclic shift may be configured for a UE. For peer discovery, the cyclic shift may be configured for a transmitting station. The transmitting station may also be assigned a set of resource elements and a set of subframes in which to send the sounding reference signal. The transmitting station may generate the sounding reference signal sequence based on its assigned parameters and may map this sequence to a set of resource elements in each SC-FDMA symbol carrying the sounding reference signal. The set of resource elements may occupy a set of subcarriers, which may be defined by a particular starting subcarrier and a particular spacing between consecutive subcarriers in the set. The transmitting station may transmit the SC-FDMA symbol carrying the sounding reference signal in similar manner as a UE. A receiving station may detect and measure the sounding reference signal from the transmitting station in similar manner as a sounding reference signal from a UE.

In yet another design, a peer discovery pilot may comprise a demodulation reference signal sent on the uplink. The demodulation reference signal may be generated based on a cyclic shift of a base sequence. For WWAN communication, the cyclic shift may be configured for a UE. For peer discovery, the cyclic shift may be configured for a transmitting station. The demodulation reference signal may be sent on one or more resource blocks assigned for transmission.

The synchronization signals and reference signals described above may be generated and transmitted as described in 3GPP TS 36.211, entitled "Evolved Universal Terrestrial Radio Access (E-UTRA); Physical Channels and Modulation (Release 8)," which is publicly available.

In another design, a peer discovery pilot may comprise a transmission sent on a physical random access channel (PRACH), a physical downlink control channel (PDCCH), a physical downlink shared channel (PDSCH), or some other physical channel for the downlink. In yet another design, a peer discovery pilot may comprise a transmission sent on a physical uplink control channel (PUCCH), a physical uplink shared channel (PUSCH), or some other physical channel for the uplink.

In general, a peer discovery pilot may comprise one or more synchronization signals and/or one or more reference signals that may be used for discovery of peer stations. A peer discovery pilot may also comprise a pilot that may be defined and transmitted especially for peer discovery. A peer discovery pilot may also comprise one or more transmissions sent on one or more physical channels. A peer discovery pilot may be transmitted in one or more unused resource blocks on the downlink or uplink, on time-frequency resources reserved for transmitting the peer discovery pilot, in multicast/broadcast single frequency network (MBSFN) subframes, etc. MBSFN subframes are subframes normally used to send multicast and/or broadcast data to multiple UEs. An MBSFN subframe may have a cell-specific reference signal sent in fewer symbol periods, which may allow more of the subframe to be used for other transmissions.

Different types of peer discovery pilots may have different ranges. For example, synchronization signals may have greater range than reference signals. The range of a peer discovery pilot may also depend on whether the network is (i) a synchronous network with all eNBs having similar frame timing or (ii) an asynchronous network with the eNBs having independent frame timing. Certain types of peer discovery pilots, such as low reuse preambles, may not be available in an asynchronous network since interference from other transmissions in the network may overwhelm the peer discovery pilots.

In one design, a transmitting station may slowly ramp up the transmit power of a peer discovery pilot in order to mitigate disruption to nearby stations. This slow ramp up may prevent outage of a receiving station as well as other stations in the vicinity of the transmitting station. The slow ramp up may be especially applicable if the peer discovery pilot comprises the primary and secondary synchronization signals sent on the downlink or the sounding reference signal sent on the uplink.

For all designs described above, an eNB may send configuration information for a peer discovery pilot to a transmitting station and possibly a receiving station. The configuration information may convey pertinent parameters for the peer discovery pilot. These parameters may include parameters used to generate the peer discovery pilot (e.g., cell ID, cyclic shift, code, etc.), parameters for resources used to transmit the peer discovery pilot, etc. The transmitting station may generate and transmit the peer discovery pilot in accordance with the configuration information. The receiving station may detect for the peer discovery pilot based on the configuration information, if available. The receiving station may also detect for the peer discovery pilot based on all possible parameter values if the configuration information is not available.

In another aspect, centralized control of P2P communication may be supported to improve performance. A designated network entity (e.g., an eNB, an MME, etc.) may control P2P communication for stations located within its coverage area. The network entity may control various aspects of P2P communication such as selection of stations for P2P communication, resource allocation, interference management, etc. The network entity may receive pilot measurements from stations desiring to communicate with one another and may select either P2P communication or WWAN communication for the stations.

In one design, if P2P communication is selected for two stations, then the network entity may assign resources to the two stations for P2P communication. The assigned resources may comprise time-frequency resources (or bandwidth), etc. The network entity may also assign transmit power levels to the two stations for P2P communication. In one design, both downlink and uplink resources may be reserved for P2P communication and may not be used for WWAN communication. This may be similar to a macro eNB reserving some resources for pico cells to allow for cell splitting gains. In this design, one station may act as an eNB and transmit using downlink resources, and the other station may act as a UE and transmit using uplink resources. This design may allow the two stations to communicate using the same radio technology (e.g., LTE, 802.11) used for WWAN communication. In another design, resources for only one direction (e.g., the uplink) may be assigned for P2P communication. In this design, the two stations may communicate peer-to-peer on the uplink using time division duplexing (TDD).

The two stations may be of the same type, e.g., two UEs. The two stations may also be of different types. For example, one station may be a UE whereas the other station may be a femto cell. In this case, the network entity may instruct the femto cell (or home eNB) to start transmitting when the UE becomes active or based on geographic or radio location of the UE, prior geographic/radio history of the UE, etc.

The network entity may also instruct some stations to act as relays for other stations and may assign resources to these stations. The network entity may determine which stations to select as relays based on various criteria such as capacity, interference, UE power and complexity, UE mobility, etc. For example, the network entity may select stations that would cause the least amount of interference on both the access link and the backhaul link. The network entity may also select multiple stations to act as relays for a single station.

Figure 4:
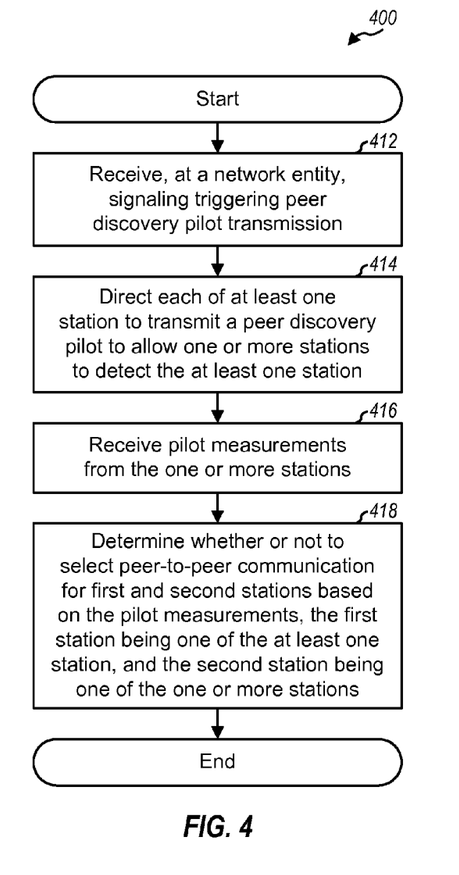
FIGS. 4 and 5 show a process and an apparatus, respectively, for supporting peer-to-peer communication by a network entity.

FIG. 4 shows a design of a process 400 for supporting P2P communication. Process 400 may be performed by a network entity, which may be a base station/eNB, a network controller, or some other entity. For example, the network entity may be a base station controlling peer-to-peer communication for UEs within its coverage. As another example, the network entity may be a network controller controlling peer-to-peer communication for UEs in a cluster of cells within its control. The network entity may receive signaling triggering peer discovery pilot transmission (block 412). The network entity may direct each of at least one station to transmit a peer discovery pilot to allow one or more stations to detect the at least one station (block 414).

In one design of block 412, the network entity may receive signaling sent by a first station to initiate communication with a second station. In one design of block 414, the network entity may direct the second station to transmit a peer discovery pilot to allow the first station to detect the second station. In another design of block 414, the network entity may direct the first station to transmit a peer discovery pilot to allow the second station to detect the first station. In yet another design of block 414, the network entity may direct the first and second stations to transmit peer discovery pilots to allow each station to detect the other station.

In another design of block 412, the network entity may receive signaling from a first station to initiate communication with any station in a particular class of stations. In another design of block 414, the network entity may direct each station in the particular class to transmit a peer discovery pilot to allow the first station to detect that station.

In yet another design of block 412, the network entity may receive signaling from a UE to initiate communication with a femto cell. In yet another design of block 414, the network entity may direct the femto cell to transmit a peer discovery pilot when the UE becomes active or based on geographic location of the UE, radio location of the UE, history of geographic or radio location of the UE, or a combination thereof.

In one design, the peer discovery pilot may comprise at least one synchronization signal, e.g., primary and secondary synchronization signals. In another design, the peer discovery pilot may comprise at least one reference signal, e.g., a cell-specific reference signal, a UE-specific reference signal, a positioning reference signal, a sounding reference signal, a demodulation reference signal, or some other reference signal. In yet another design, the peer discovery pilot may comprise at least one transmission on at least one physical channel. The at least one transmission may be used for peer discovery.

The network entity may receive pilot measurements from the one or more stations (block 416). The pilot measurements from each station may comprise pilot measurements for at least one peer discovery pilot from the at least one station, pilot measurements for reference signals from base stations, etc. The network entity may determine whether or not to select peer-to-peer communication for first and second stations based on the pilot measurements (block 418). The first station may be one of the at least one station transmitting peer discovery pilot. The second station may be one of the one or more stations receiving peer discovery pilot. If peer-to-peer communication is selected, then the network entity may assign resources to the first and second stations and may send information indicative of the assigned resources to these stations. If peer-to-peer communication is not selected, then the network entity may direct the first and second stations to communicate via WWAN.

In one design, the first and second stations may communicate via at least one base station in a WWAN prior to being direct to transmit peer discovery pilot. The first and second stations may be directed to communicate peer-to-peer after being directed to transmit peer discovery pilot.

In one scenario, the station(s) transmitting the peer discovery pilot(s) and the station(s) receiving the peer discovery pilot(s) may be under the control of the network entity. In another scenario, the transmitting station(s) and the receiving station(s) may be under the control of different network entities. For example, the network entity may control a first subset of the transmitting and receiving stations, and a second network entity may control a second subset of the transmitting and receiving stations. The network entity may communicate with the second network entity to exchange information for the transmitting station(s), information for the receiving station(s), information for the peer discovery pilot(s), and/or other information.

Figure 5:
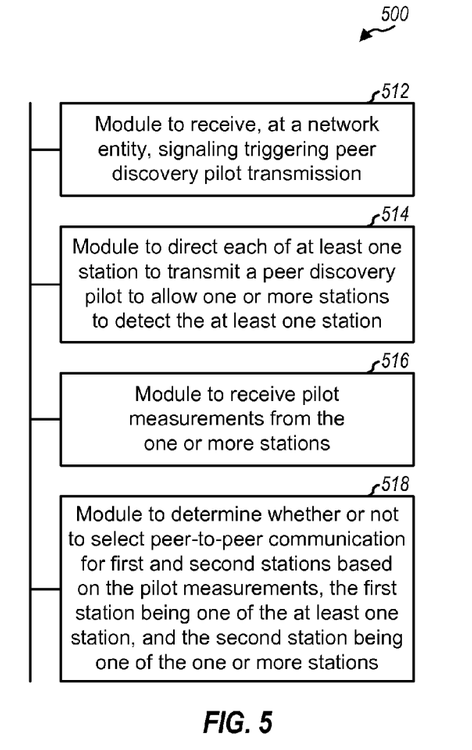

FIG. 5 shows a design of an apparatus 500 supporting P2P communication. Apparatus 500 includes a module 512 to receive, at a network entity, signaling triggering peer discovery pilot transmission, a module 514 to direct each of at least one station to transmit a peer discovery pilot to allow one or more stations to detect the at least one station, a module 516 to receive pilot measurements from the one or more stations, and a module 518 to determine whether or not to select peer-to-peer communication for first and second stations based on the pilot measurements. The first station may be one of the at least one station transmitting peer discovery pilot, and the second station may be one of the one or more stations receiving peer discovery pilot.

Figure 6:
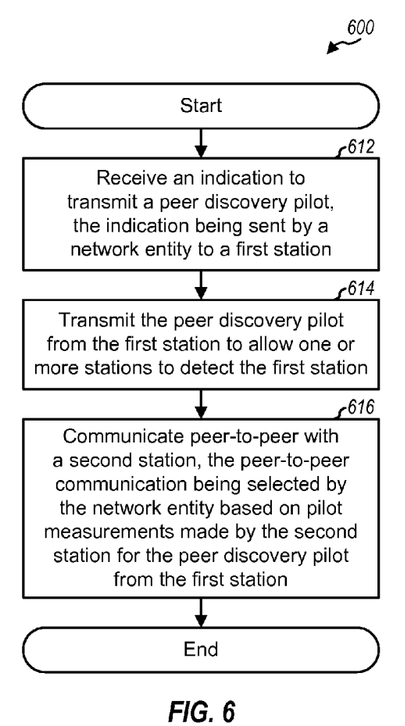
FIGS. 6 and 7 show a process and an apparatus, respectively, for transmitting a peer discovery pilot.

FIG. 6 shows a design of a process 600 for supporting P2P communication. Process 600 may be performed by a first station, which may be a UE, a femto cell, etc. The first station may receive, from a network entity, an indication to transmit a peer discovery pilot (block 612). The first station may also receive configuration information used to generate and transmit the peer discovery pilot. The first station may transmit the peer discovery pilot to allow one or more stations to detect the first station (block 614). The peer discovery pilot may comprise at least one synchronization signal, or at least one reference signal, or at least one transmission on at least one physical channel, or a combination thereof. The first station may communicate peer-to-peer with a second station (block 616). The peer-to-peer communication may be selected by the network entity based on pilot measurements made by the second station for the peer discovery pilot from the first station.

The indication to transmit a peer discovery pilot may be generated by the network entity in various manners. In one design, the first station may send signaling to initiate communication with the second station, and the network entity may generate the indication based on the signaling from the first station. In another design, the network entity may generate the indication based on signaling sent by the second station to initiate communication with the first station. In yet another design, the network entity may generate the indication based on signaling sent by the second station to initiate communication with any station in a particular class of stations. The first station may belong in the particular class. In yet another design, the first station may be a femto cell, and the network entity may generate the indication based on a UE served by the femto cell becoming active, geographic location of the UE, radio location of the UE, history of geographic or radio location of the UE, or a combination thereof. The network entity may also generate the indication in other manners.

In one scenario, the first station may transmit the peer discovery pilot under the control of the network entity. In another scenario, the first station may start transmitting the peer discovery pilot prior to receiving the indication from the network entity, e.g., when the first station is outside of network coverage. Subsequently, the first station may transmit the peer discovery pilot under the control of the network entity, e.g., when the first station moves within the network coverage.

Figure 7:
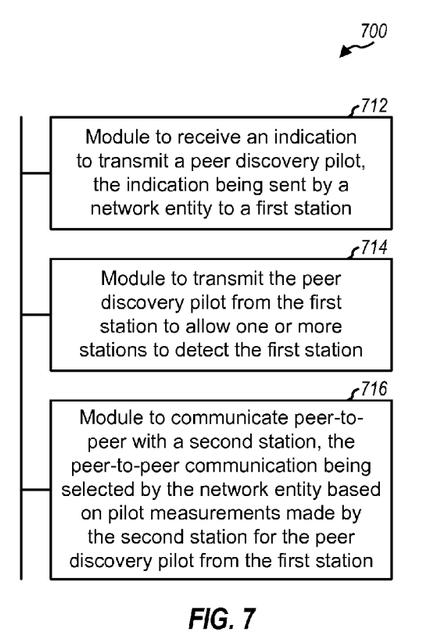

FIG. 7 shows a design of an apparatus 700 supporting P2P communication. Apparatus 700 includes a module 712 to receive an indication to transmit a peer discovery pilot, the indication being sent by a network entity to a first station, a module 714 to transmit the peer discovery pilot from the first station to allow one or more stations to detect the first station, and a module 716 to communicate peer-to-peer with a second station. The peer-to-peer communication may be selected by the network entity based on pilot measurements made by the second station for the peer discovery pilot from the first station.

Figure 8:
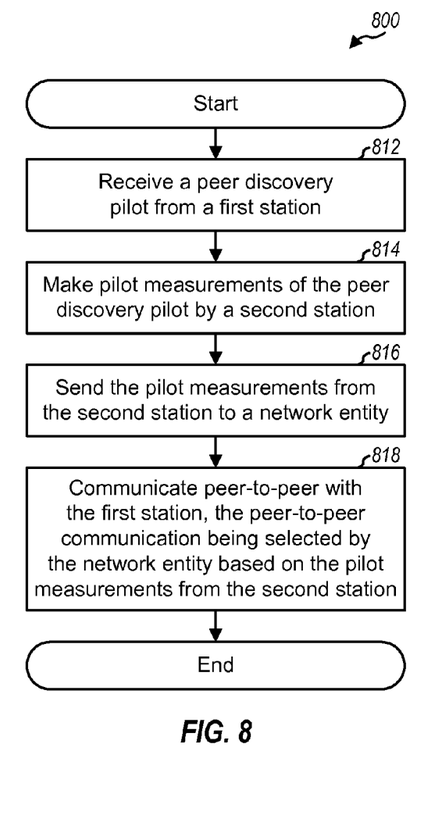
FIGS. 8 and 9 show a process and an apparatus, respectively, for receiving a peer discovery pilot.

FIG. 8 shows a design of a process 800 for supporting P2P communication. Process 800 may be performed by a second station, which may be a UE or some other entity. The second station may receive a peer discovery pilot from a first station (block 812). The second station may receive configuration information for the peer discovery pilot from a network entity and may receive the peer discovery pilot based on the configuration information. Alternatively, the second station may autonomously detect for the peer discovery pilot from the first station. In any case, the second station may make pilot measurements of the peer discovery pilot (block 814) and may send the pilot measurements to the network entity (block 816). The second station may thereafter communicate peer-to-peer with the first station (block 818). The peer-to-peer communication may be selected by the network entity based on the pilot measurements from the second station.

In one design, the network entity may initiate transmission of the peer discovery pilot by the first station in response to signaling sent by the first station to initiate communication with the second station. In another design, the network entity may initiate transmission of the peer discovery pilot by the first station in response to signaling sent by the second station to initiate communication with the first station. In yet another design, the network entity may initiate transmission of the peer discovery pilot by the first station in response to signaling sent by the second station to initiate communication with any station in a particular class of stations. The first station may belong in the particular class. In yet another design, the first station may be a femto cell and the second station may be a UE served by the femto cell. The network entity may initiate transmission of the peer discovery pilot by the femto cell when the UE becomes active or based on geographic location of the UE, radio location of the UE, history of geographic or radio location of the UE, or a combination thereof.

Figure 9:
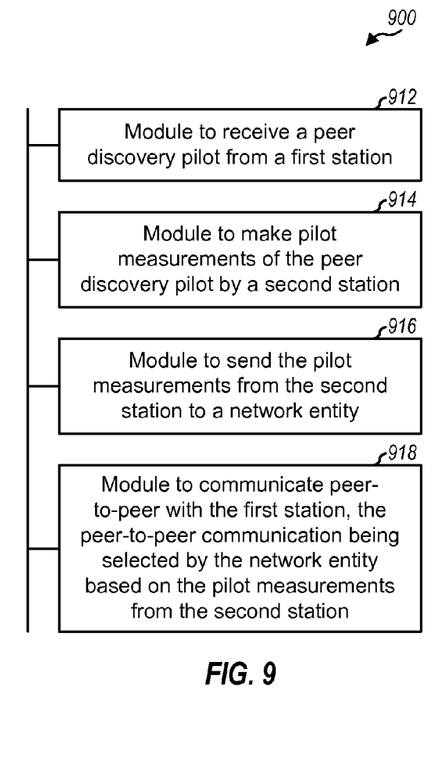

FIG. 9 shows a design of an apparatus 900 supporting P2P communication. Apparatus 900 includes a module 912 to receive a peer discovery pilot from a first station, a module 914 to make pilot measurements of the peer discovery pilot by a second station, a module 916 to send the pilot measurements from the second station to a network entity, and a module 918 to communicate peer-to-peer with the first station. The peer-to-peer communication may be selected by the network entity based on the pilot measurements from the second station.

The modules in FIGS. 5, 7 and 9 may comprise processors, electronic devices, hardware devices, electronic components, logical circuits, memories, software codes, firmware codes, etc., or any combination thereof.

For clarity, much of the description above refers to P2P communication and WWAN communication. In general, the techniques described herein may be applicable for P2P communication and (i) WWAN communication between stations and base stations/eNBs, (ii) WLAN communication between stations and access points (e.g., using Wi-Fi), and (iii) WPAN communication between stations and devices (e.g., using Bluetooth). Hence, references to WWAN communication in the description above may be replaced with WWAN communication, WLAN communication, and/or WPAN communication.

Figure 10:
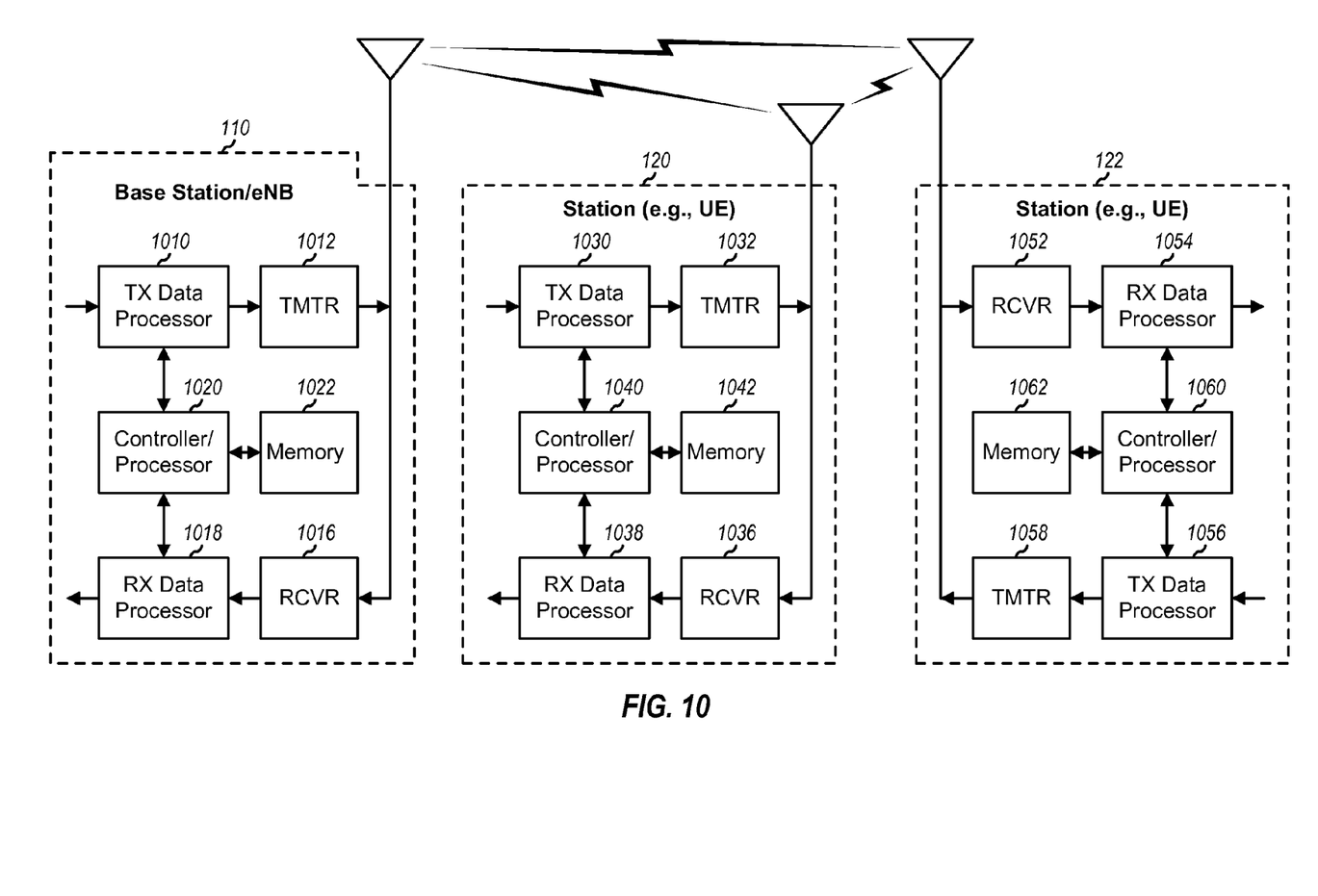
FIG. 10 shows a design of a base station and two stations.

FIG. 10 shows a block diagram of a design of base station/eNB 110 and two stations 120 and 122. Each station may be a UE or some other entity. At base station 110, a transmit (TX) data processor 1010 may receive data to send to stations and may process (e.g., encode and modulate) the data for each station in accordance with one or more modulation and coding schemes for that station to obtain data symbols. Processor 1010 may also process control information to obtain control symbols, generate reference symbols for reference signals and synchronization signals, and multiplex the data symbols, the control symbols, and the reference symbols. Processor 1010 may further process the multiplexed symbols (e.g., for OFDM, etc.) to generate output samples. A transmitter (TMTR) 1012 may condition (e.g., convert to analog, amplify, filter, and upconvert) the output samples to generate a downlink signal, which may be transmitted to stations 120 and 122.

At station 120, the downlink signal from base station 110 may be received and provided to a receiver (RCVR) 1036. Receiver 1036 may condition (e.g., filter, amplify, downconvert, and digitize) the received signal and provide input samples. A receive (RX) data processor 1038 may process the input samples (e.g., for OFDM, etc.) to obtain received symbols. Processor 1038 may further process (e.g., demodulate and decode) the received symbols to recover data and control information sent to station 120. On the uplink, a TX data processor 1030 may process (e.g., encode and modulate) data and control information to be sent by station 120 to obtain data symbols and control symbols. Processor 1030 may also generate reference symbols for a peer discovery pilot and/or other reference signals, multiplex the data and control symbols with the reference symbols, and process the multiplexed symbol (e.g., for SC-FDMA, etc.) to obtain output samples. A transmitter 1032 may condition the output samples and generate an uplink signal, which may be transmitted to base station 110 and/or station 122.

At base station 110, the uplink signal from station 120 may be received and conditioned by a receiver 1016, and processed by an RX data processor 1018 to recover the data and control information sent by station 120. A controller/processor 1020 may control data transmission on the downlink and uplink.

Station 120 may also communicate peer-to-peer with station 122. Data, control information, peer discovery pilot, and reference signals may be processed by TX data processor 1030 and conditioned by transmitter 1032 to generate a P2P signal, which may be transmitted to station 122. Station 122 may receive the P2P signal from station 120. The P2P signal may be conditioned by receiver 1036 and processed by RX data processor 1030 to recover data, control information, peer discovery pilot, and reference signals sent by station 120.

Station 122 includes a receiver 1052, a transmitter 1058, an RX data processor 1054, a TX data processor 1056, a controller/processor 1060, and a memory 1062 that may operate in similar manner as the corresponding units at station 120.

Controllers/processors 1020, 1040 and 1060 may control the operation at base station 110, station 120, and station 122, respectively. Controller/processor 1020 may also perform or direct process 400 in FIG. 4 and/or other processes for the techniques described herein. Controllers/processors 1040 and 1060 may each perform or direct process 600 in FIG. 6, process 800 in FIG. 8, and/or other processes for the techniques described herein. Controllers/processors 1020, 1040 and 1060 may also direct or perform processing for the eNB, station A, and station B, respectively, in FIG. 2. Memories 1022, 1042 and 1062 may store data and program codes for base station 110, station 120, and station 122, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting peer-to-peer communication, comprising:
   receiving, at a network entity, signaling triggering peer discovery pilot transmission; and
   directing each of at least one station to transmit a peer discovery pilot to allow one or more stations to detect the at least one station
   wherein the receiving signaling comprises receiving signaling sent by a first station to initiate communication with a second station.

2. The method of claim 1, wherein the directing each of the at least one station to transmit a peer discovery pilot comprises directing the second station to transmit a peer discovery pilot to allow the first station to detect the second station.

3. The method of claim 1, wherein the directing each of the at least one station to transmit a peer discovery pilot comprises directing the first station to transmit a peer discovery pilot to allow the second station to detect the first station.

4. The method of claim 1, wherein the directing each of the at least one station to transmit a peer discovery pilot comprises directing each of the first and second stations to transmit a peer discovery pilot to allow the first station to detect the second station and to allow the second station to detect the first station.

5. The method of claim 1, further comprising:
   supporting communication between the first and second stations via at least one base station in a wireless wide area network (WWAN) prior to directing each of the at least one station to transmit a peer discovery pilot; and
   directing the first and second stations to communicate peer-to-peer after directing each of the at least one station to transmit a peer discovery pilot.

6. A method of supporting peer-to-peer communication, comprising:
   receiving, at a network entity, signaling triggering peer discovery pilot transmission; and
   directing each of at least one station to transmit a peer discovery pilot to allow one or more stations to detect the at least one station
   wherein the receiving signaling comprises receiving signaling from a first station to initiate communication with any station in a particular class of stations, and wherein the directing each of the at least one station to transmit a peer discovery pilot comprises directing each station in the particular class to transmit a peer discovery pilot to allow the first station to detect the station.

7. A method of supporting peer-to-peer communication, comprising:
   receiving, at a network entity, signaling triggering peer discovery pilot transmission; and directing each of at least one station to transmit a peer discovery pilot to allow one or more stations to detect the at least one station wherein the receiving signaling comprises receiving signaling from a user equipment (UE) to initiate communication with a femto cell, and wherein the directing each of the at least one station to transmit a peer discovery pilot comprises directing the femto cell to transmit a peer discovery pilot when the UE becomes active, or based on geographic location of the UE, or based on radio location of the UE, or based on history of geographic or radio location of the UE, or based on a combination thereof.

8. A method of supporting peer-to-peer communication, comprising:

receiving, at a network entity, signaling triggering peer discovery pilot transmission; and directing each of at least one station to transmit a peer discovery pilot to allow one or more stations to detect the at least one station receiving pilot measurements from the one or more stations; and determining whether or not to select peer-to-peer communication for first and second stations based on the pilot measurements, the first station being one of the at least one station, and the second station being one of the one or more stations.

9. The method of claim 8, further comprising:

assigning resources to the first and second stations if peer-to-peer communication is selected; and sending information indicative of the assigned resources if peer-to-peer communication is selected.

10. A method of supporting peer-to-peer communication, comprising:

receiving, at a network entity, signaling triggering peer discovery pilot transmission; and directing each of at least one station to transmit a peer discovery pilot to allow one or more stations to detect the at least one station communicating between the network entity and a second network entity to exchange information for the at least one station, or information for the one or more stations, or information for the peer discovery pilot from each of at least one station, or a combination thereof, wherein a first subset of the at least one station and the one or more stations is under control of the network entity, and wherein a second subset of the at least one station and the one or more stations is under control of the second network entity.

11. A method of supporting peer-to-peer communication, comprising:

receiving, at a network entity, signaling triggering peer discovery pilot transmission; and directing each of at least one station to transmit a peer discovery pilot to allow one or more stations to detect the at least one station, wherein the peer discovery pilot comprises at least one synchronization signal.

12. A method of supporting peer-to-peer communication, comprising:

receiving, at a network entity, signaling triggering peer discovery pilot transmission; and directing each of at least one station to transmit a peer discovery pilot to allow one or more stations to detect the at least one station, wherein the peer discovery pilot comprises at least one reference signal.

13. A method of supporting peer-to-peer communication, comprising:

receiving, at a network entity, signaling triggering peer discovery pilot transmission; and directing each of at least one station to transmit a peer discovery pilot to allow one or more stations to detect the at least one station, wherein the peer discovery pilot comprises at least one transmission on at least one physical channel, the at least one transmission being used for peer discovery.

14. A method of supporting peer-to-peer communication, comprising:

receiving, at a network entity, signaling triggering peer discovery pilot transmission; and directing each of at least one station to transmit a peer discovery pilot to allow one or more stations to detect the at least one station, wherein the network entity is a base station controlling peer-to-peer communication for user equipments (UEs) within coverage of the base station.

15. A method of supporting peer-to-peer communication, comprising:

receiving, at a network entity, signaling triggering peer discovery pilot transmission; and directing each of at least one station to transmit a peer discovery pilot to allow one or more stations to detect the at least one station, wherein the network entity is a network controller controlling peer-to-peer communication for user equipments (UEs) in a cluster of cells.

16. An apparatus for supporting peer-to-peer communication, comprising:

means for receiving, at a network entity, signaling triggering peer discovery pilot transmission; and means for directing each of at least one station to transmit a peer discovery pilot to allow one or more stations to detect the at least one station wherein the means for receiving signaling comprises means for receiving signaling sent by a first station to initiate communication with a second station, and wherein the means for directing each of the at least one station to transmit a peer discovery pilot comprises means for directing the second station to transmit a peer discovery pilot to allow the first station to detect the second station, or directing the first station to transmit a peer discovery pilot to allow the second station to detect the first station, or directing each of the first and second stations to transmit a peer discovery pilot to allow the first station to detect the second station and to allow the second station to detect the first station.

17. An apparatus for supporting peer-to-peer communication, comprising:

means for receiving, at a network entity, signaling triggering peer discovery pilot transmission; and means for directing each of at least one station to transmit a peer discovery pilot to allow one or more stations to detect the at least one station, wherein the means for receiving signaling comprises means for receiving signaling from a first station to initiate communication with any station in a particular class of stations, and wherein the means for directing each of the at least one station to transmit a peer discovery pilot comprises means for directing each station in the particular class to transmit a peer discovery pilot to allow the first station to detect the station.

18. An apparatus for supporting peer-to-peer communication, comprising:

means for receiving, at a network entity, signaling triggering peer discovery pilot transmission; and means for directing each of at least one station to transmit a peer discovery pilot to allow one or more stations to detect the at least one station, wherein the means for receiving signaling comprises means for receiving signaling from a user equipment (UE) to initiate communication with a femto cell, and wherein the means for directing each of the at least one station to transmit a peer discovery pilot comprises means for directing the femto cell to transmit a peer discovery pilot when the UE becomes active, or based on geographic location of the UE, or based on radio location of the UE, or based on history of geographic or radio location of the UE, or based on a combination thereof.

19. An apparatus for supporting peer-to-peer communication, comprising:

means for receiving, at a network entity, signaling triggering peer discovery pilot transmission; and means for directing each of at least one station to transmit a peer discovery pilot to allow one or more stations to detect the at least one station, further comprising:

means for receiving pilot measurements from the one or more stations; and means for determining whether or not to select peer-to-peer communication for first and second stations based on the pilot measurements, the first station being one of the at least one station, and the second station being one of the one or more stations.

20. The apparatus of claim 19, further comprising:

means for assigning resources to the first and second stations if peer-to-peer communication is selected; and means for sending information indicative of the assigned resources if peer-to-peer communication is selected.

21. An apparatus for supporting peer-to-peer communication, comprising:

at least one processor configured to receive, at a network entity, signaling triggering peer discovery pilot transmission, and to direct each of at least one station to transmit a peer discovery pilot to allow one or more stations to detect the at least one station, wherein the at least one processor is configured to receive signaling sent by a first station to initiate communication with a second station, and to direct the second station to transmit a peer discovery pilot to allow the first station to detect the second station, or direct the first station to transmit a peer discovery pilot to allow the second station to detect the first station, or direct each of the first and second stations to transmit a peer discovery pilot to allow the first station to detect the second station and to allow the second station to detect the first station.

22. An apparatus for supporting peer-to-peer communication, comprising:

at least one processor configured to receive, at a network entity, signaling triggering peer discovery pilot transmission, and to direct each of at least one station to transmit a peer discovery pilot to allow one or more stations to detect the at least one station, wherein the at least one processor is configured to receive signaling from a first station to initiate communication with any station in a particular class of stations, and to direct each station in the particular class to transmit a peer discovery pilot to allow the first station to detect the station.

23. An apparatus for supporting peer-to-peer communication, comprising:

at least one processor configured to receive, at a network entity, signaling triggering peer discovery pilot transmission, and to direct each of at least one station to transmit a peer discovery pilot to allow one or more stations to detect the at least one station, wherein the at least one processor is configured to receive signaling from a user equipment (UE) to initiate communication with a femto cell, and to direct the femto cell to transmit a peer discovery pilot when the UE becomes active, or based on geographic location of the UE, or based on radio location of the UE, or based on history of geographic or radio location of the UE, or based on a combination thereof.

24. An apparatus for supporting peer-to-peer communication, comprising:

at least one processor configured to receive, at a network entity, signaling triggering peer discovery pilot transmission, and to direct each of at least one station to transmit a peer discovery pilot to allow one or more stations to detect the at least one station, wherein the at least one processor is configured to receive pilot measurements from the one or more stations and to determine whether or not to select peer-to-peer communication for first and second stations based on the pilot measurements, the first station being one of the at least one station, and the second station being one of the one or more stations.

25. An apparatus for supporting peer-to-peer communication, comprising:

at least one processor configured to receive, at a network entity, signaling triggering peer discovery pilot transmission, and to direct each of at least one station to transmit a peer discovery pilot to allow one or more stations to detect the at least one station, wherein the at least one processor is configured to assign resources to the first and second stations if peer-to-peer communication is selected, and to send information indicative of the assigned resources if peer-to-peer communication is selected.

26. An apparatus for supporting peer-to-peer communication, comprising:

means for receiving an indication to transmit a peer discovery pilot, the indication being sent by a network entity to a first station; and means for transmitting the peer discovery pilot from the first station to allow one or more stations to detect the first station further comprising:

means for communicating peer-to-peer with a second station, wherein peer-to-peer communication is selected by the network entity based on pilot measurements made by the second station for the peer discovery pilot from the first station.

* * * * *